METHOD OF MAKING FLEXIBLE MULTICONDUCTOR WIRING UNITS

Filed Oct. 19, 1960

Inventor:
Robert W. Tabor,
by Robert O. Richardson
Att'y

United States Patent Office 3,271,214
Patented Sept. 6, 1966

3,271,214
METHOD OF MAKING FLEXIBLE MULTI-CONDUCTOR WIRING UNITS

Robert W. Tabor, Nashua, N.H., assignor to Sanders Associates, Inc., Nashua, N.H., a corporation of Delaware Filed Oct. 19, 1960, Ser. No. 63,624
2 Claims. (Cl. 156—52)

The application of Victor F. Dahlgren, Serial No. 21,272, filed April 11, 1960, now Patent No. 2,997,521 (a continuation of Serial No. 509,364, filed May 18 1955, Serial No. 459,841, filed October 1, 1954, and Serial No. 598,170, filed July 16, 1956), describes an article which has had extensive commercial use, consisting of a flexible sheet or strip which comprises a plurality of independent electrical conductors received in a matrix of resinous insulating material. Such an article is sometimes referred to as a "printed circuit," or as a "cable," although it is not in itself a complete circuit and is not in itself printed, although techniques known in the printing art may be used in its production, and it is a cable only in the sense that it may embody a number of separate conductors side by side. I shall herein refer to it as a flexible multiconductor wiring unit.

The construction, and the method by which it has been made may be briefly described as follows. A sheet of thin copper foil was oxidized by a solvent chemical process to provide it with adherent surface coating of crystalline black copper oxide, at least predominantly cupric oxide. This sheet of foil was superposed on a preformed sheet of thermoplastic resinous insulating material, as, for example, and by preferred choice, polytrifluorochloroethylene (which it will be convenient to refer to by the trade resignation Kel-F) and the two pressed together under heat to provide a tenacious bond of the adherent oxide coating to the surface of the plastic. Portions of the copper and its coating were then etched away to leave relatively narrow spaced bands which served as conductors in the completed article. The simplest form of such conductors would be a series of parallel strips extending from one end to the other of the sheet. The removal of the copper between and around such bands left an imprint of the oxide coating on the parts of the resinous sheet which were thus exposed between them. A similar sheet of thermoplastic resin was then superposed on the exposed face of this assembly and heat and pressure applied, whereby this second sheet of resinous plastic was bonded to the exposed oxide coated surfaces of the remaining copper areas and also intruded into the spaces between them and surrounding them and bonded to the base layer of plastic in an autogenous weld at the location of the roughened imprint exposed in those spaces by the removal of the copper.

The dimensions of the parts involved require that the manufacturing process be a careful one. The metallic deposit which is left after etching reproduces a complex of electrical elements which have been carefully designed, both as to their dimensions and their relative spacing, to satisfy the electrical demand of the intended use and to adapt the product of the dimensional characteristics of the installation of which the unit is to form a part. The conductors may branch, turn to one side, or be diverted in groups, and terminals may be located at different positions. In practice this layout is prepared graphically by the designing electrical engineer and reproduced by him or competent graphical artisans, or indeed artists, with the aid of photographic means if convenient to provide changes in scale, in a form which amounts to a graphic full-sized image in plan of the complex of conductors which are to be incorporated in the unit in their proper relative relationships. By suitable means a reproduction of this image in resistant ink is applied to the exposed surface of the copper which has been adhered to the base of plastic material, and after etching there is left adherent to this base a reproduction of this image in copper constituting the complex of conductors in the proper spatial relationship one to another and maintained in such relationship by the powerful adherence of the copper oxide coating to the plastic. This complex is to be covered over when the unit is completed without disturbing the relationship. As the scale of the parts and the clearances diminishes and the complexity of the pattern increases and, it may be said, as a manufacturing proposition, when the size of the run of a given pattern increases, the practical demands of accuracy are still greater. There may be rejects, as in any manufacturing process, but there should not be many rejects.

The present invention has resulted from an analysis of the possible causes of malfunction, which analysis whether correct or not, has led to a prescription for a change in the light of such analysis which has proved highly effective in practice.

The exposition will be facilitated by reference to the accompanying drawings which are diagrammatic, and probably will be useful chiefly as a kind of graphic memorandum of what will be expressed in words. They are not to scale or in proper relative proportion.

FIG. 1 is a plan view with parts broken away of an illustrative wiring unit encapsulating a plurality of electrical conductors;

FIG. 1–*a* is an enlarged section on line **1–*a*—1–*a*** of FIG. 1;

Figures 1, 1A, 2, 3, 4, 5, 6, 7:
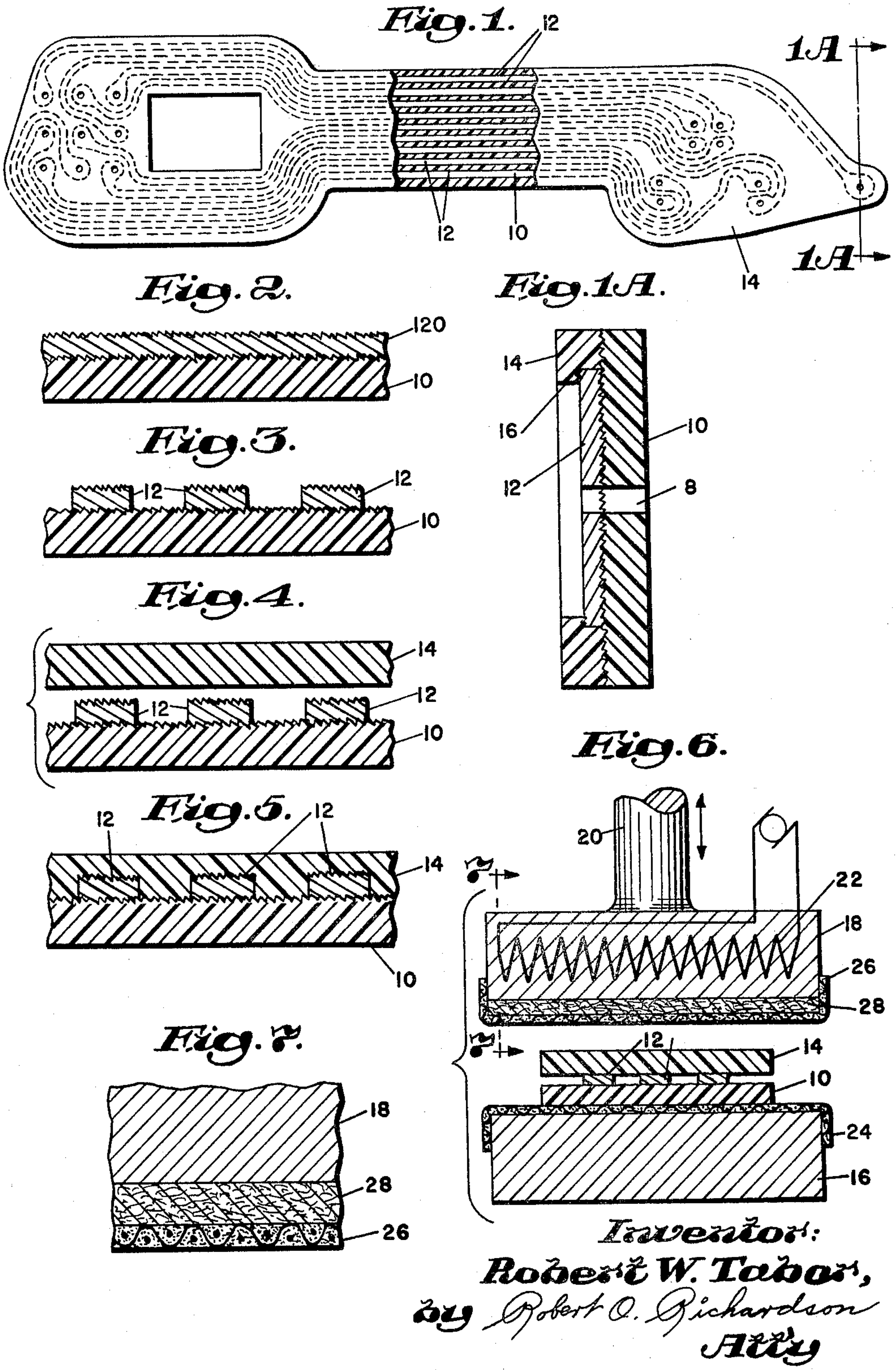
FIG. 2 is a schematic sectional view showing the relationship of certain of the parts at an early stage of the manufacturing process.
FIG. 3 is a similar view at a later stage.
FIG. 4 illustrates a step at a later stage.
FIG. 5 illustrates the product resulting from the joining of the parts seen in FIG. 4.
FIG. 6 is a schematic view of a press by the use of which the parts are joined.
FIG. 7 is an enlarged section on line 7—7 of FIG. 6.

It has been stated that these drawings are not to scale or in proportion, but certain dimensions are here given in round numbers to facilitate understanding. They are of the general order of magnitude occurring in practice. Thus copper foil may be so-called "two-ounce" copper and have a thickness somewhat less than three mils and the plastic sheets in the case of Kel-F may be about five mils in thickness.

It may further be desirable to state at this point that in explaining the union of the various parts by heat and pressure I have for simplicity disclosed and specifically described a mechanism wherein the heat is supplied from one side of the assembly only.

Referring now to the drawings:

FIG. 1 illustrates a flexible multi-conductor wiring unit which may be produced in accordance with the invention. It illustrates with considerable verisimilitude an actual commercial article, neither the simplest in form nor one exceptionally complicated. The actual unit was about 7⅝ inches long. It comprises in its construction a sheet 10 of thermoplastic, resinous material (such as Kel-F) to which are adhered a number of flat strips 12 of copper, which serve as conductors and which are covered over by another sheet 14 of the same or generally similar resinous material adhering to the opposite faces of the conductors and joined to the opposed face of the sheet 10 in an autogenous weld in the areas between the conductors and surrounding them. It will be understood that after the device is made, it is stamped out or trimmed to the contour shown.

Referring to FIG. 1–*a* the sheet 14 may have holes 16 cut therethrough at suitable places which in the assembly are registered with the ends of certain conductors rendering them accessible for making electrical connections thereto. In the present instance a small hole 8 extends through the sheets 10 and the overlying part of the conductor 12 and it may receive a prong or a wire end and solder may be applied to the end of such an element and the exposed face of the conductor 12 within the area of the hole 16 to complete the connection.

Reference is now made to FIGS. 2, 3, 4 and 5, illustrating diagrammatically different stages in the formation of the unit. In FIG. 2 a sheet 10 of thermoplastic resinous insulating material has secured to the face thereof by heat and pressure a sheet 120 of copper foil. The numeral 120 is used to refer to this entire sheet from which are formed the conductors 12, presently to be referred to. The boundaries of this sheet are shown by irregular lines in FIG. 2, indicating a coating of black copper oxide which may be produced on the copper foil by the method described in the patent to Meyer No. 2,364,993. The irregular line indicates the rough surface provided by the strongly adherent crystals of copper oxide. No attempt has been made to indicate the thickness of this body of crystals. In this initial step a large strip or sheet of copper foil is imposed on a sheet of plastic and the surface of the plastic is softened by heat and pressure to permit it to enter the interstices between the adherent crystals of black oxide on the copper, and freeze as a strongly adherent joint. As an example of the strength of this joint, it may be stated that if the end of a strip of Kel-F five mils thick is overlapped on a strip of prepared copper and joined as described, and two joined parts are pulled apart in the plane of the joint in a tug-of-war type of test, the plastic will break without casing slip of the joint.

The exposed face of the foil sheet 120 has applied thereto a resist in the desired pattern of the conductors 12 and the sheet is then etched to dissolve away the exposed parts of the copper. At this stage the parts are as indicated in FIG. 3, with the thin flat conductors strongly bonded to the base sheet 10 through the medium of the copper oxide. At the exposed face of the sheet 10 between the conductors, the dissolving away of the copper leaves an imprint of the rough surface provided by the copper oxide crystals as indicated in FIG. 2 by the irregular line. This imprint facilitates the formation of a secure weld between the exposed face of the sheet 10 and the cover sheet 14 of resinous material which in FIG. 4 is shown positioned above, but spaced away from, the conductors 12.

The sheet 14 is superposed upon the exposed faces of the conductors 12 and the assembly is then subjected to heat and pressure in a suitable press as hereinafter to be described, to produce the construction shown in FIG. 5, wherein the conductors are encapsulated by the sheets 10 and 14, the enclosing plastic being firmly bonded to both faces of the copper conductors and the two sheets joined in face to face relation in the spaces between and around the conductors.

After the etching (as seen in FIG. 3), the copper which appears on the face of the base sheet 10, consists of thin strips 12 disposed in the desired pattern which it is vital to preserve, and on this reliance is had primarily on the tenacious joint first formed, although the area of this joint as regards any one of the conductor elements is absolutely small.

The most obvious and gross defect in a finished article would be a misplacement of one or more conductors in the plane of the pattern so that one or more was brought into contact with or in excessively close proximity to another. This of course might be due to some gross local defect in the copper sheet or the plastic sheet, which gives rise to a weak spot large in relationship to the remaining areas at some particular location. Otherwise we would infer that in some way the conductors had slipped laterally in the plane of the joint and in response to some force having a substantial component in that plane, either by failure of a joint or a plastic deformation of a portion of the plastic sheet which carried with it the conductors on its outer surface.

When the cover sheet 14 is placed over the array of conductors 12 it is softened by heat, first to cause it to adhere to the exposed copper oxide surfaces of those conductors, and also to cause it to intrude into the space between adjacent conductors to weld to the rough surface of exposed plastic 10 in the spaces between them. (See FIG. 5.) Whether the plastic is pushed down into the open space beneath or, on the contrary, the conductors are pushed up into the plastic, seems to be a relative question and perhaps expresses no distinction. In examining a section the line of weld appears to be at the bottom of this space and in it the interlocking surface between the original rough surface and the superposed plastic layer appears. There is an actual coalescence of the plastic here as indicated by the fact that in the finished article the copper strip may be freed and torn out in either direction, and it will rip either sheet of plastic apparently without starting the joint. That is, the joint seems to be as strong as the plastic. A certain amount of heat is, of course, transmitted from the copper to the underlying plastic, but the latter does not become very soft, and it is not believed that a substantial weakening of the bond for a significant length of time occurs. On the other hand, the overlying sheet is softened to a considerable degree, but of course it does not become liquefied or freely flowing.

Now let is consider an area of the assembly one inch square with conductors three mils thick of such width and in such proximity that they cover one-half of this area. Obviously the spaces between the edges of the conductors are three mils deep and amount in sum in the area of one square inch to $\frac{3}{2000}$ of a cubic inch. If the plastic sheet is applied over the same and has a thickness of five mils the opposed volume is $\frac{5}{1000}$ of a square inch, and this means that at least three-fifths of this material must be in some way plastically deformed and intruded into the spaces.

It may be remarked that on inspection by the naked eye the outer surface of the assembly does not show a ribbed appearance. We may inquire, although we cannot supply a categorical answer, whether the entry of this material or the deformation of the plastic incident thereto tends to squeeze apart the conductors and places a substantial shearing strain at a point between the conductors and the base strip. Generally we may assume that the sides of the conductors are perpendicular. If, as a result of the etching, they are somewhat undercut, an upward component of force might be exerted. On the other hand if they were narrower at the top than at the base, a body of softened plastic pushed thereinto would develop an additional component of force parallel to the plane of the assembly. It should be noted however that in the case of a series of parallel conductors this matter of forces would apparently tend in a considerable degree to balance one another. The extreme case, which probably does not occur, would be where the conductors were released into a thinly fluent medium and simply floated more or less at random in response to stray forces, or where the adjacent portions of the plastic sheets were so mobile that they could float and carry the conductors with them on the more rigid underlying portions.

All these remarks are speculative and are not represented as being a statement of observed and measured facts, but they have suggested an improvement in the mechanisms used and a resultant modification of the process which has in fact proved of considerable advantage in handling quickly and in repetitive fashion large runs of panels wherein the components are of small dimension and arranged in particularly intricate relationships and constitute a significant improvement of the prior art practice.

The improved process will now be described in connection with FIG. 6 which illustrates the parts shown in FIG. 4, but with the top sheet 14 laid in position on the conductors and the assembly in position on the bed 16 of a press, which has a reciprocating head 18 as indicated by the showing of a ram shaft 20 with indicating arrow. Means are provided for heating the head 18, herein diagrammed as an electrical heating coil 22. A suitable release sheet 24, to prevent undesired adhesion of the base sheet 10 to the bed 16, is provided and a release sheet 26 is also provided over ram 18. In the present instance this sheet 26 may consist of a fine, woven fabric of glass fiber dressed with polytetrafluoroethylene resin. Other materials, such as the Kel-F resin referred to, do not readily bond to such resin. The dressed fabric however is very flexible and also pervious to gases. In accordance with the invention there is provided between the slip sheet 26 and the ram head 18 of the press a yieldable sheet 28 of substantial thickness and having a uniform outer face and a porous body, the construction being such that it is of stable dimensions in its plane, but has a high range of resilient compressibility under local pressure perpendicular to the same, that is, vertically viewing FIG. 6. This capacity of high range resilient compressibility allows what will be termed "vertical yieldable pressing."

Various materials may be used for this yieldable sheet depending upon the materials being joined and the amount of heat which it is necessary to use in order sufficiently to soften the sheet 14 and cause it to bond to the apposed surface of the conductors 12 and intrude between the same to bond to the surfaces of the sheet 10 which are exposed between the conductors. Thus in the case of polyethylene sheets which soften at a relatively low temperature and are easily bonded one to another, a sheet of ordinary chipboard which should be dry and porous, may be used for one or a few operations. It cannot be used for a long series of operations, but must be changed from time to time. On examining such a sheet after use depressions may be seen on the face thereof, and we conclude that its elasticity is not such as to provide adequate recovery between successive frequently repeated operations. However, the presence of such markings tends to support the theoretical analysis of the operation given in the first part of this specification. A fabric, preferably of wool, of substantial thickness and felted, knitted or woven, may be utilized, or a batt of fine glass fibers, and for long runs and high temperatures a fine fabric of stainless steel, with an open mesh filled with and supporting as an extended sheet a layer of steel wool.

The way the pad 28 acts is believed to be the following. As the head viewing FIG. 6 descends, the lower surface of the covering makes contact with the top of the sheet 14 and its further descent is resisted by the conductors 12. The parts of the sheet 14 directly supported thereby tend to sink into the covering while the lower surface of the latter continues downwardly and presses the intervening portions of the sheet 14 into the spaces between the conductors.

In this connection it should be noted that the sheet 14 is not a rigid body and when it is softened by heat it may have considerable plastic flow. It is not, of course, a liquid, but nevertheless the pressure of the head is exerted thereon in such a way as to be propagated in all directions like a hydraulic pressure, and may be called quasi-hydraulic, to avoid the suggestion that we are concerned with a freely flowing liquid. It will be seen that the pressure is transmitted through the quasi-liquid directly vertically on the upper surfaces of the conductors 12, and they are thus clamped by this pressure in the desired position without tendency to move them laterally and displace them or break the bond which they have previously made to the base sheet 10, and which they are about to make with the lower surface of the material in the covering sheet 14. Similarly, the plastic material in the sheet 14 rearranges itself under this pressure flowing in a manner similar to a liquid into the spaces between the conductors and the material levels itself out and the two sheets are pressed into contact with the same vertical pressure exerted from the yielding face of the ram covering.

This explanation of the operation finds further confirmation from the following considerations. A wiring device of this kind when pressed together between two rigid heated surfaces, may frequently show bubbles which are at least an apparent defect, and may be a practical one. The parts which have been pressed together may have absorbed a certain amount of air or air adsorbed to their surfaces, and obviously a certain amount of air is trapped beneath the covering sheet 14 when it is assembled with the other parts, as seen in FIG. 6, and this air will tend to be displaced into the softened plastic and at least some of it be trapped there, but in the present instance it may pass into and be dissipated in the porous body 28. The slip sheet 26, as already explained, while not being likely to stick to the plastic, is pervious. The body of softened plastic is compressed under quasi-hydraulic pressure and air is forced out in bubbles through the semi-fluid and into the porous body 28, leaving the product free of bubbles of entrapped air. This passage of bubbles will be referred to hereafter as "degassing."

It will be apparent that the invention may be embodied in other specific forms without departing from the spirit or essential attributes thereof, and the present embodiment should therefore be considered in all respects as illustrative and not restrictive, as is in fact clear in several matters from the description itself. Reference is to be had to the appended claims to indicate those principles of the invention exemplified by the particular embodiment described and which it is desired to secure by Letters Patent.

I claim:

1. The method of fabricating a flexible multiconductor wiring unit comprising the steps of:
   (a) bonding to a first preformed sheet of thermoplastic insulating resin a complex of thin flat electrical conductors relatively spaced one from another,
   (b) covering the conductors with a second preformed sheet of thermoplastic insulating resin,
   (c) placing such assembly on a flat unyielding platen, said first preformed sheet of thermoplastic insulating resin being in contact with said platen,
   (d) heating said second preformed sheet of thermoplastic insulating resin to a temperature effective to cause softening thereof, and
   (e) applying pressure to said heated second preformed sheet of thermoplastic insulating resin by means of a flat porous member having a degree of resilient compressibility, said pressure being at least adequate to cause the second sheet to bond to the opposed surface of the electrical conductors and intrude between the same to weld to the surfaces of the first sheet which are exposed between the conductors.

2. The method of fabricating a flexible multiconductor wiring unit defined in claim 1, wherein said second preformed sheet of thermoplastic insulating resin is heated to a temperature effective to cause a degree of plastic flow therein.

References Cited by the Examiner

UNITED STATES PATENTS

| | | | |
|---|---|---|---|
| 2,643,699 | 6/1953 | Krueger | 154—1 |
| 2,932,599 | 4/1960 | Dahlgren. | |
| 2,964,436 | 12/1960 | Mikulis et al. | |

FOREIGN PATENTS

| | | |
|---|---|---|
| 848,608 | 9/1960 | Great Britain. |

OTHER REFERENCES

New High Temperature Thermoplastic, Modern Plastics, pages 168, 170, and 172, October 1948.

EARL M. BERGERT, *Primary Examiner.*

CARL F. KRAFFT, *Examiner.*

R. I. SMITH, *Assistant Examiner.*